Sept. 26, 1961     H. S. MOORE ET AL     3,001,269
COMPOSITE MATERIAL, BRAZING ALLOYS AND PROCESS OF MANUFACTURE
Filed Sept. 20, 1954
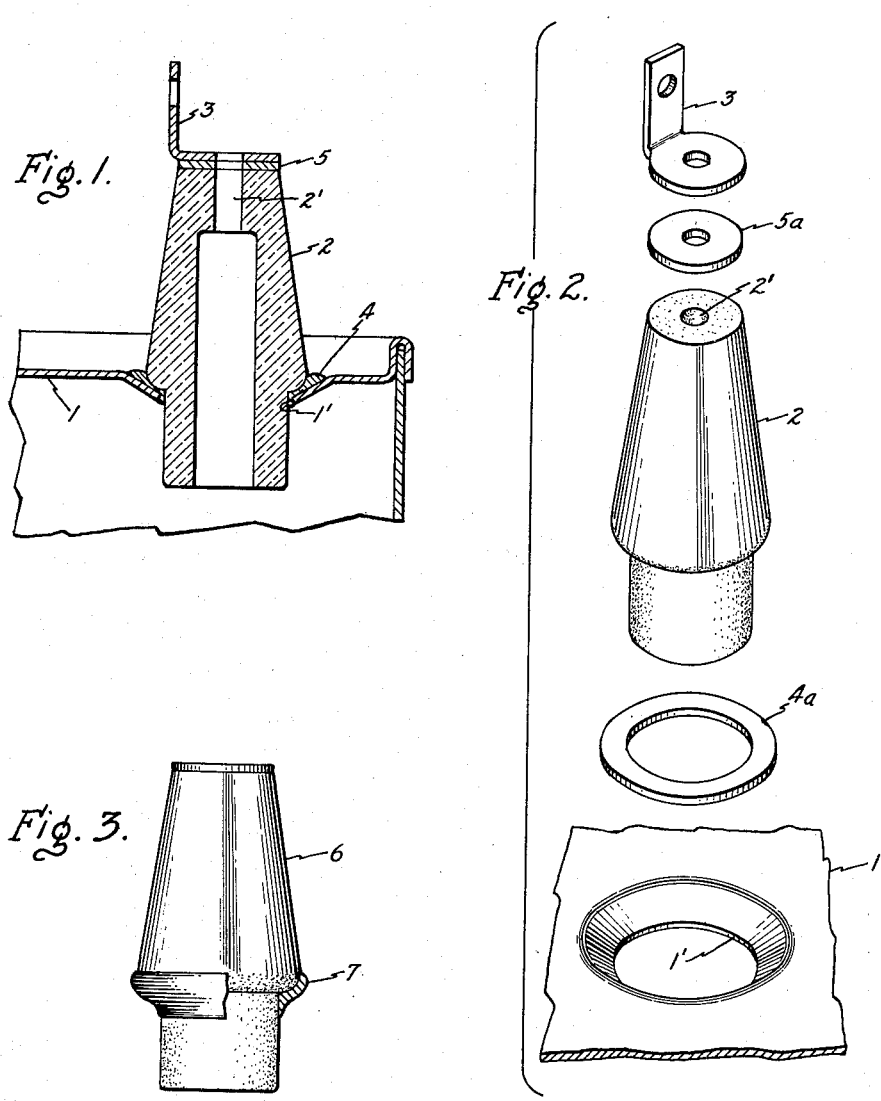
Inventors
Hugh S. Moore,
Vincent F. Procopio,
by Gilbert P. Tarleton
Their Attorney.

United States Patent Office 3,001,269
Patented Sept. 26, 1961

3,001,269
COMPOSITE MATERIAL, BRAZING ALLOYS AND PROCESS OF MANUFACTURE
Hugh S. Moore and Vincent F. Procopio, Pittsfield, Mass., assignors to General Electric Company, a corporation of New York
Filed Sept. 20, 1954, Ser. No. 457,262
6 Claims. (Cl. 29—180)

The present invention relates to brazing or soldering alloys and processes using the same. More particularly, the present invention concerns improved fusible alloy materials which can be used for making a direct hermetic ceramic-to-metal or ceramic-to-ceramic seal, or applied as a metallizing material to a ceramic surface prior to joining the ceramic to a metal or another ceramic.

In this connection, the term "ceramic" as used herein is intended to include such materials as porcelain, stoneware, whiteware, glass, pottery, quartz, carbon, silicon carbide and other refractory, vitreous and mineral materials.

The present alloy material is of the type containing titanium or zirconium, or combinations thereof. Sealing materials containing titanium are already known, this substance having been found to make an extremely intimate bond with ceramic surfaces. In previous bonding processes, this substance has been utilized in its free or metallic form as titanium, or in the form of titanium hydride which, in the sealing operation, dissociates to deposit metallic titanium on the surface to which it is applied.

In its elemental or finely-divided state, titanium is extremely active and is readily converted to the oxide, which prevents the formation of an effective ceramic-to-metal seal. This has required the use of a relatively pure hydrogen or other non-oxidizing atmosphere for the brazing process. Furthermore, in previous methods of making ceramic-to-metal seals using titanium, it has been necessary to carry out the process in a plurality of steps which resulted in elaborate, time-consuming and expensive operations. For example, in known processes a titanium-containing material is first applied to a surface of a ceramic article to be bonded to a metal, and then a series of metal layers are applied, such as by painting, spraying, electroplating and the like, over the initial deposit of titanium-containing material, the metal article or member to be bonded then being welded or otherwise joined to the outermost metal layer. In many cases the titanium alloy materials used heretofore were found to be unsatisfactory as brazing alloys, since they were quite brittle and hard to work and apply effectively to the surfaces to be sealed or metallized.

It is an object, therefore, of the present invention to provide a brazing alloy which overcomes the above-mentioned disadvantages.

It is a further object of the present invention to provide a simplified process of making fluid-tight, strongly adherent ceramic-to-metal and ceramic-to-ceramic seals.

It is another object of the present invention to provide an improved brazing or soldering alloy for making effective ceramic-to-metal and ceramic-to-ceramic seals.

It is a further object of the present invention to provide a joint structure using the above improved soldering alloy.

A brazing alloy material of the present invention, by way of example, may be composed of a fusible alloy consisting essentially of titanium, copper, silver and a ductile metal having a melting point lower than the remaining metals of the alloy. It has been found, in accordance with the invention, that lead is a ductile low melting point metal which is of an exceptional value in the present brazing alloy. Among other notable advantages, lead was found to greatly aid the flow of the molten alloy composition to which it was added, thereby enabling the alloy to more effectively function as a soldering material.

In this connection the expressions "brazing" and "soldering" as used herein are intended to refer to the same operation, which involves the process of uniting bodies using a fusible material at a temperature above the melting point of the latter material.

Features of the invention which are believed novel are set forth in particular in the appended claims. The invention itself, however, together with further objects and advantages thereof may be better understood from the following description taken in connection with the accompanying drawing in which:

FIG. 1 is a sectional view of a ceramic insulating bushing joined to metallic members in accordance with the present invention;

FIG. 2 is an exploded view of the assembly shown in FIG. 1 showing the component parts thereof; and FIG. 3 is a view of an insulating ceramic bushing provided with a metallizing coating in accordance with the invention.

Referring now to the drawing, and particularly to FIGS. 1 and 2, there is shown a ceramic bushing 2 inserted loosely into an aperture 1′ in a metal capacitor cover 1 or the like, the bushing 2 having a channel 2′ through which a wire may pass to be connected to terminal 3.

In making the joint 4 between ceramic bushing 2 and metal cover 1, a brazing ring 4a (see FIG. 2) is preferably first arranged at the junction of the bushing and the cover, the brazing ring being composed of the alloy material having a composition more fully described hereinafter. The thus assembled parts are placed in a furnace muffle in a non-oxidizing atmosphere, such as in hydrogen or a dissociated ammonia atmosphere, and heated to a temperature above the melting point of the alloy, but below the melting points of metal cover 1. At such temperature, the brazing ring 4a melts, and by virtue of the lead component therein and the capillary flow and wetting action which is promoted thereby, the molten alloy flows well along the adjoining surfaces of both the metal cover 1 and ceramic bushing 2 to form a strong hermetic seal joining the bushing to the cover. The fluid-tight joint formed thereby has been found to result from a chemical bond between the alloy material and the bonded surfaces which is stronger than the ceramic itself. The assembly can be moved into the cooling zone of the furnace immediately after melting occurs, the time for both sealing and cooling depending on the mass of the assembly. Of particular significance in this procedure is the fact that the entire brazing operation takes place in one step with the use of only one brazing material, thus considerably simplifying the bonding operation.

Joint 5 between terminal 3, which may be of brass composition, and the top of ceramic bushing 2 may be formed in a manner similar to that of seal 4, with the assembled parts being simultaneously heated to braze the terminal 3 to bushing 2. However, it will be generally found convenient or desirable to initially apply the brazing ring 5a only to the bushing and metallize the latter with the brazing alloy at the fusing temperature. In such procedure, the lead component of the brazing alloy likewise promotes wetting of the ceramic surface to enhance the intimate bond between the titanium or the alloy and the ceramic. The proportion of lead in the alloy used in this procedure is preferably less than that used in making joint 4, so as to confine the flow of the brazing material more or less to the area at the top of bushing 2, since less spreading of the alloy is desired in view of the already comparatively large area of contact between the flat brazing ring 5a and the ceramic bushing 2.

Thereafter, the terminal 3 may at any time be firmly bonded to bushing 2 merely by placing it in position thereon in contact with the metallized coating formed by brazing ring 5a, and heating the assembly above the melting point of the alloy. The flow of the alloy takes place into the surface of terminal 3 to thereby form a strong ceramic-to-metal seal, as in the previously described procedures.

FIG. 3 illustrates a ceramic bushing 6 which is provided with a metallized brazing coating 7 having a composition in accordance with the present invention. The material which forms coating 7 may be a finely-divided form of the alloy metals described herein, the powdered alloy or metal mixtures being suspended in a fugitive vehicle to facilitate application of the alloy as a coating to the ceramic surface. Such carrier materials may include varnish, lacquer, cellulose acetate, cellulose nitrate and the like. The suspended alloy material is then applied initially to the bushing in any suitable manner and heated in a non-oxidizing atmosphere above the melting point of the alloy to thereby form a metallized coating 7 on the bushing. Thereafter, when desired, the metallized bushing 6 may be inserted into an aperture or recess of a supporting plate such as cover 1, and by heating the assembly to a suitable temperature, a portion of the metallized coating will flow into the adjoining surface of the supporting plate and will form a strong hermetic ceramic-to-metal seal between the supporting plate and the bushing. If desired, instead of applying coating 7 by means of a suspension of the brazing alloy in finely divided form, the metallized coating may be formed merely by placing a brazing ring at the desired position on the bushing and fusing the brazing ring to the bushing under suitable heat in a non-oxidizing atmosphere. Either process will produce equally satisfactory and effective bonding results.

In forming the present alloy for use in solid form, the metal components of the present alloy preferably are first finely divided to a size corresponding to the order of 325 mesh. The powders are mechanically mixed in proportions according to the desired properties, and are then pressed into the desired form of the appropriate size, such as in a ring, rod, ribbon or other suitable form. These pressed metal forms are then sintered at about 100° C. below the melting point of the alloy in a hydrogen atmosphere. The incorporation of a ductile metal such as lead in the alloy, in accordance with the invention, facilitates the shaping of the solid alloy into desired form, which makes the alloy more convenient to apply to the area where the joint or seal is to be made.

The present brazing alloy may be effectively used for metallizing or sealing ceramic materials of a great variety, including the materials mentioned above in defining the expression "ceramic" as used herein. The surfaces of the ceramics to be bonded can be smooth, glazed, or rough and need not be clean in order to be effectively bonded by the present alloy.

The metals which may be suitably directly bonded to ceramics by the use of the present brazing alloys should, of course, be those having a melting point higher than the particular composition of brazing alloy used. Such metals include, but are not limited to, steel, iron, copper, brass, nickel and alloys thereof.

While the present brazing alloy will find particular use for direct ceramic-to-metal seals where the metal is of a higher melting point than the alloy, the present alloy is also adapted for use in bonding metals having lower melting points, such as aluminum and magnesium. Bodies made of such metals may be joined to ceramics provided with a metal brazing coating of the present invention merely by brazing the metal, e.g., aluminum, to the metal coating using known commercial aluminum brazing material, which melts 50° C. below the melting point of aluminum, in known brazing methods. Such a process is much simpler than previous methods, which have required considerably more complicated operations to effectively join aluminum to a ceramic, such as by casting the aluminum onto a ceramic surface which has been provided with separate sealing and soldering layers. Using the present process, an aluminum capacitor casing, for example, can be hermetically joined to a bushing metallized in accordance with the invention.

The composition of the present brazing alloy will vary depending on such factors as the desired melting point, the extent of flow of the alloy, the degree of wetting of the surfaces to which the alloy is applied, the degree of ductility of the formed alloy or finished joint, the particular surfaces to be bonded, and other factors.

In general, the brazing alloys of the present invention will have a melting point ranging between 650° C.–1100° C. The particular components of the brazing alloy may be divided into three groups. In the first group there is preferably included titanium or zirconium and alloys or combinations thereof. These metals, particularly titanium, diffuse into the ceramic surfaces to be bonded and due to their reactive nature combine chemically therewith to form an intimate bond with the ceramic member to which they are applied.

The second group includes a ductile metal of comparatively low melting point which serves to increase the flow of the alloy and its wetting effect, and of this group lead has been found to be by far the most effective. Other metals which may be suitably used instead of lead include zinc, bismuth, cadmium, indium, and tin, and combinations and alloys thereof.

The third group of components includes such metals as copper, silver, and nickel and combinations and alloys thereof, these metals serving to provide the main structure or body of the brazed joint and impart the necessary strength thereto. Copper in particular is effective for wetting steel. In sealing to copper hardware, silver contributes to wetting of the copper.

The amount of lead in the brazing alloy will vary between 10–85% by weight depending largely on the degree of ductility and extent of flow desired in the alloy. In amounts over 30%, the lead serves to provide flexibility in the resulting joint, such as in a butt joint between a ceramic and a metal where the difference in the coefficients of expansion of the bonded materials is relatively great. The use of lead in the alloy produces marked improvements in the brazing alloy as well as the brazing process using the same, and provides numerous advantages. For example, the replacement of the titanium in the brazing material by lead not only allows a reduction in cost of the alloy, but also reduces the brittleness of the finished joint caused by excessive amounts of titanium. Further, the lead makes the alloy ductile enough to be shaped into desired form for convenient brazing operations, e.g., shaped into ring form as shown in the drawing. Also, lead lowers the melting point of the alloy so as to allow working with metals of lower melting points than heretofore possible. It increases the flow of the alloy in the brazing operation, and by wetting the surfaces to be bonded induces capillary action causing the alloy to flow into the joint. A particularly significant function of the lead is its protection of the highly active titanium in the alloy from oxidation which may result in a less satisfactory bond. Hence, the heating of the alloy in the brazing process may be carried out in a poorer non-oxidizing atmosphere, such as in ordinary line hydrogen, than is necessary in brazing operations where titanium hydride, for example, is used in the brazing alloy. This allows continuous brazing operations to be carried on, if desired.

In the brazing alloy about 2–10% of titanium is preferably used, with 5% being usually of particular preference. Zirconium may be substituted for all or part of the titanium. While these substances have proved extremely effective in the present alloy composition in producing excellent ceramic-to-metal seals and are preferred, there are also indications that tantalum and niobium may give comparable results.

The remainder of the alloy, as mentioned above, is preferably constituted by copper, silver, nickel or combinations or alloys thereof. Copper is preferably used in the range of 10-85%, silver in the range of 5-85%, and nickel in the range of 5-20%.

The following table sets forth several specific compositions of the present brazing alloys, but it should be understood that these compositions are given by way of illustration only and are not to be interpreted as limiting the scope of the invention in any way, since other and different compositions may be effectively used depending on the particular results sought or materials to be bonded.

COMPOSITIONS IN PERCENT BY WEIGHT

|  | I | II | III | IV | V | VI |
|---|---|---|---|---|---|---|
| Titanium | 5 | 5 | 5 | 5 | 5 | 5 |
| Lead | 15 | 25 | 25 | 35 | 35 | 35 |
| Copper | 80 | 70 | 60 | 18 | 45 | 50 |
| Silver |  |  | 10 | 42 | 15 |  |
| Nickel |  |  |  |  |  | 10 |
| Melting temperature, °C | 940 | 940 | 880 | 750 | 650 | 1,100 |

A certain amount of flexibility is possible within an alloy composition. For example, in composition II, which is preferred as a general purpose material, the lead content can be varied from 15 to 30% with a corresponding alteration of the copper content. Changes within these limits do not appreciably alter the melting point, which is in agreement with the copper-lead phase diagram. The effect of such changes is to vary the degree of flow of the brazed metal. Bonding takes place but little or no flow is found with 15% lead and increasing lead up to 30% produces a corresponding increase in flow. Accordingly, an alloy having composition II would be selected where good flow is desired, whereas an alloy having composition I would be chosen where the amount of flow of the alloy is to be restricted. Alloy V would be selected for use where a particularly low melting point is desired, while alloy VI would serve best where a high melting point alloy is necessary.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention. For example, while the present invention has been mainly described with respect to ceramic-to-metal seals provided by the present brazing alloy, other types of seals such as ceramic-to-ceramic and even metal-to-metal joints may be effectively achieved with the use of the present compositions, since the alloy has been found to be generally useful in directly bonding materials of a great variety so long as they are of melting points higher than the alloys. Also, while the invention has been shown and described with reference to joining ceramic bushings to a capacitor cover and the application of a metallized coating to a ceramic bushing, it is obvious that other objects and bodies could be similarly joined or metallized preparatory to joining without departing from the scope of the invention. Further, instead of metallizing a ceramic prior to joining it to a metal as described above, the metal may first be metallized before it is joined to the ceramic, if desired.

The present invention lends itself for use in a variety of applications, and among these might be mentioned the metallizing of glass or other ceramic plates to form printed electrical circuits, and to produce an electrode coating on glass or ceramic dielectric materials such as in capacitors; the assembly of different ceramic parts to form complicated structures which would be impractical with either pressed or wet process porcelains, steatite and similar ceramics; and the manufacture of double-walled evacuated devices such as window panes and vacuum containers. Other applications and uses will occur to those skilled in the art.

What we claim as new and desire to secure by Letters Patent of the United States is:

1. A soldering material composed of a fusible alloy consisting essentially of about 4-10% by weight of a metal selected from the group consisting of titanium and zirconium and combinations and alloys thereof; about 10-85% of lead; and the remainder a metal selected from the group consisting of copper, silver, and nickel and combinations and alloys thereof.

2. A joint structure comprising a ceramic member and a metal member joined by including a bonding material formed from a fusible alloy consisting essentially of about 2-10% by weight of a metal selected from the group consisting of titanium and zirconium and combinations and alloys thereof; about 10-85% of lead; and the remainder a metal selected from the group consisting of copper, silver, and nickel and combinations and alloys thereof.

3. A joint structure comprising a ceramic member and a metal member joined by a bonding material formed from a fusible alloy consisting essentially of about 2-10% by weight of a metal selected from the group consisting of titanium and zirconium and combinations and alloys thereof; about 10-85% of a ductile metal selected from the group consisting of lead, zinc, bismuth, cadmium, indium, and tin, and combinations and alloys thereof; and the remainder a metal selected from the group consisting of copper, silver, and nickel, and combinations and alloys thereof.

4. A joint structure comprising ceramic bodies joined together by a soldering material composed of a fusible alloy consisting essentially of about 2-10% by weight of a metal selected from the group consisting of titanium and zirconium and combinations and alloys thereof; about 10-85% of a ductile metal selected from the group consisting of lead, zinc, bismuth, cadmium, indium, and tin, and combinations and alloys thereof; and the remainder a metal selected from the group consisting of copper, silver, and nickel, and combinations and alloys thereof.

5. The method of bonding a ceramic to an aluminum member which comprises metallizing the surface of the ceramic with a fusible alloy consisting essentially of 2-10% by weight of a metal selected from the group consisting of titanium and zirconium and combinations and alloys thereof; about 10-85% of a ductile metal selected from the group consisting of lead, zinc, bismuth, cadmium, indium, and tin, and combinations and alloys thereof; and the remainder a metal selected from the group consisting of copper, silver and nickel, and combinations and alloys thereof; and brazing the aluminum member to the fusible alloy thus bonded to the ceramic surface, thereby forming a tightly adherent hermetic ceramic-to-aluminum seal.

6. The method of bonding a ceramic to an aluminum member which comprises metallizing the surface of the ceramic with a fusible alloy consisting essentially of about 2-10% by weight of a metal selected from the group consisting of titanium and zirconium and combinations and alloys thereof, about 10-85% of lead, and the remainder a metal selected from the group consisting of copper, silver, and nickel, and combinations and alloys thereof; and brazing the aluminum member to the fusible alloy thus bonded to the ceramic surface, thereby forming a tightly adherent hermetic ceramic-to-aluminum seal.

(References on following page)

References Cited in the file of this patent

UNITED STATES PATENTS

| | | |
|---|---|---|
| 935,863 | Rossi | Oct. 5, 1909 |
| 2,293,822 | Haven | Aug. 25, 1942 |
| 2,351,798 | Alexander | June 20, 1944 |
| 2,466,700 | Grodsky | Apr. 12, 1949 |
| 2,490,571 | Anicetti | Dec. 6, 1949 |
| 2,570,248 | Kelley | Oct. 9, 1951 |
| 2,667,427 | Nolte | Jan. 26, 1954 |
| 2,667,431 | Burnside | Jan. 26, 1954 |
| 2,668,923 | Bondley | Feb. 9, 1954 |
| 2,739,375 | Coxe | Mar. 27, 1956 |
| 2,771,969 | Brownlow | Nov. 27, 1956 |

OTHER REFERENCES

Metals Handbook, 1948 ed., pub. Am. Soc. for Metals, pp. 917, 1200 and 1206.

"Ceramic to Metal Seals for Vacuum Tubes," by Thomas L. Evans (presented at Symposium on Ceramics, Apr. 21, 1953), pub. "Ceramic Age," August 1954, pp. 9–13.

UNITED STATES PATENT OFFICE
CERTIFICATE OF CORRECTION

Patent No. 3,001,269            September 26, 1961

Hugh S. Moore et al.

It is hereby certified that error appears in the above numbered patent requiring correction and that the said Letters Patent should read as corrected below.

Column 6, line 20, after "by" strike out "including".

Signed and sealed this 17th day of April 1962.

(SEAL)
Attest:

ESTON G. JOHNSON
Attesting Officer

DAVID L. LADD
Commissioner of Patents